Aug. 14, 1962
R. KÖSTER
3,049,407
PROCESS FOR THE PRODUCTION OF BORON ALKYLS
AND OF HIGHLY ACTIVE ALUMINIUM OXIDE
Filed Sept. 30, 1958
$$B_2O_3 + 2\,AlR_3 = 2BR_3 + Al_2O_3$$
$$A: B_2O_3 + BR_3 = (RBO)_3$$
$$B: (RBO)_3 + 2\,AlR_3 = 3BR_3 + Al_2O_3$$
$$R = C_3H_7$$
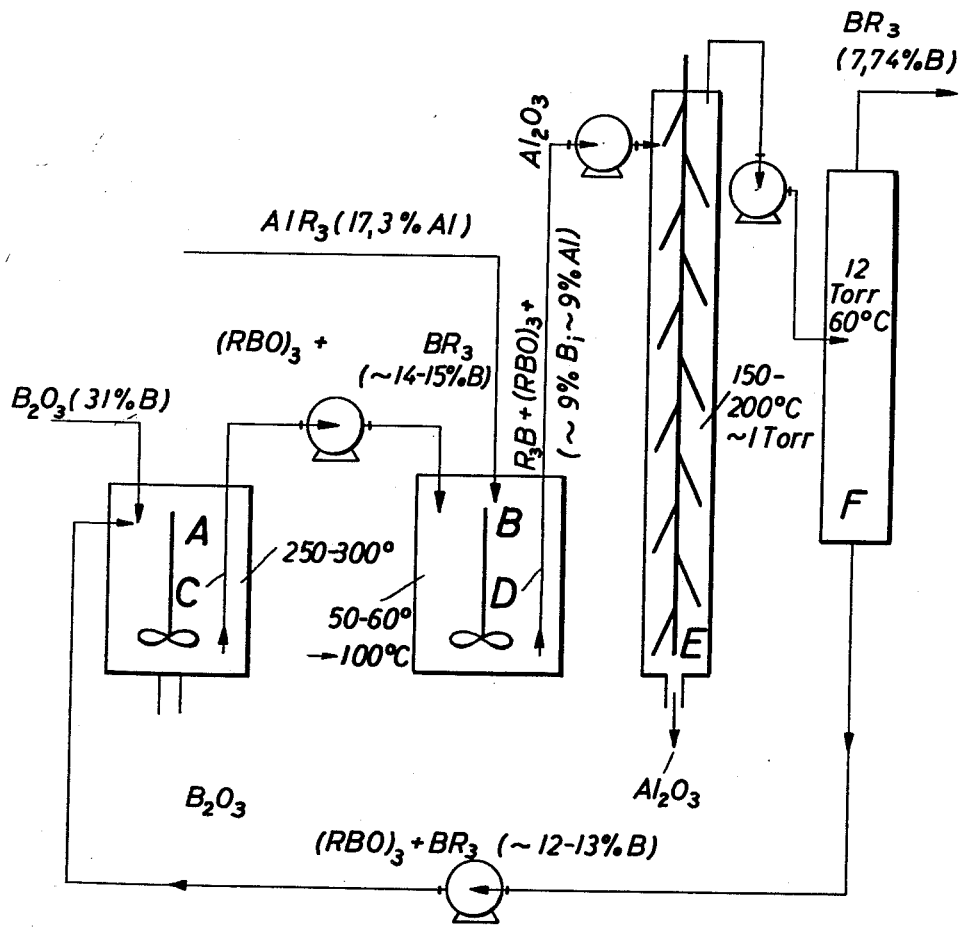
INVENTOR
ROLAND KÖSTER
BY
Burgess, Dinklage & Sprung
ATTORNEYS 3,049,407
PROCESS FOR THE PRODUCTION OF BORON ALKYLS AND OF HIGHLY ACTIVE ALUMINIUM OXIDE
Roland Köster, Mulheim (Ruhr), Germany, assignor to Studiengesellschaft Kohle m.b.H., Mulheim (Ruhr), Germany, a corporation of Germany
Filed Sept. 30, 1958, Ser. No. 764,422
Claims priority, application Germany Oct. 3, 1957
5 Claims. (Cl. 23—143)

This invention concerns a process for the production of boron alkyls and of highly active aluminium oxide.

It is known boron trialkyls can be produced by the reaction of boron trihalides, advantageously boron trifluoride, with aluminium trialkyls. The use of boric acid esters $B(OR)_3$, instead of boron trihalides, for the production of boron hydrocarbons $BR_3$ has also been proposed.

The starting material for the production both of the boron halides and of the boric acid esters is boric acid or its anhydride, boron trioxide $B_2O_3$. The molecular structure of $B_2O_3$ is characterised by the presence of a plurality of B—O—B bonds, perhaps as shown in the following diagram:

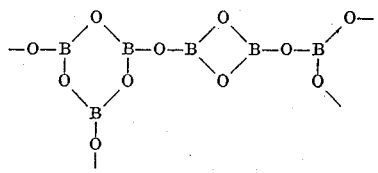

As compared with the known processes, it would be an important simplification if this boron trioxide could be reacted directly with aluminium trialkyls in accordance with the equation:

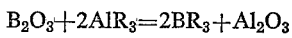
$$B_2O_3 + 2AlR_3 = 2BR_3 + Al_2O_3$$

to give aluminium oxide and boron trialkyls. Experiments have however shown that this reaction does not take place under condtions which can be used technically. Rather, the experiments showed that the B—O—B bond has low reactivity with respect to the aluminium trialkyls.

If boron trioxide is treated at relatively high temperatures with boron trialkyls, so-called boroxols are formed in accordance with Equation A.

(A)  $B_2O_3 + BR_3 = (RBO)_3$ i.e.

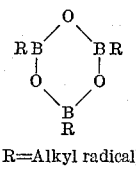

(R=Alkyl radical)

These boroxols are cyclic trimeric anhydrides of monoalkyl boric acids.

If their formation is observed, the boroxols can summarily be regarded as solutions of boron trioxide in boron trialkyls.

It has now been found that the B—O—B bonds in these trialkyl boroxols react with all three alkyl groups of aluminium trialkyls, so that the following reaction B occurs:

(B) 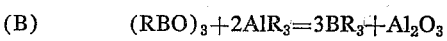 $(RBO)_3 + 2AlR_3 = 3BR_3 + Al_2O_3$

R represents alkyl radicals, which can be the same or different, and which advantageously comprise more than 2 carbon atoms.

If the reaction of this invention is carried out using compounds of the general formula $AlHR_2$, in which each R represents an alkyl radical, instead of using aluminium trialkyls $AlR_3$, alkyl diboranes of the general formula $B_2H_2R_4$ are formed, together with active aluminium oxide and boron trialkyls. This reaction also utilizes all the alkyl or hydride groups of the aluminium compound, that is to say the reaction proceeds in accordance with the equation:

$$(RBO)_3 + 2AlHR_2 = BR_3 + B_2H_2R_4 + Al_2O_3$$

The advantages over the known processes of the process according to the invention are readily apparent. Boron trioxide $B_2O_3$ which, technically, is very inexpensive, is reactive in the form of the liquid boroxols without it being necessary first of all to convert the oxide into a boron halide or a boric acid ester by the use of auxiliary reactants (halogens, alcohols).

However, to initiate the process of the invention it is necessary to have boron trialkyl ready prepared for the production of the boroxol. However, considering boron trioxide as the starting material, since the two reaction stages A and B (A) $\qquad BR_3 + B_2O_3 = (RBO)_3$ (B) $\qquad (RBO)_3 + 2AlR_3 = 3BR_3 + Al_2O_3$ can be combined with one another, one mol of boron trialkyl taken to begin with finally yields 3 mols of boron trialkyl. As will readily be appreciated, the process operates in accordance with the following simple empirical reaction equation:

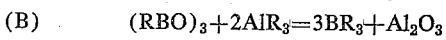
(A+B=C) $\quad B_2O_3 + 2AlR_3 = 2BR_3 + Al_2O_3$

In order to produce boron alkyls economically in accordance with the invention, it is particularly advantageous to use aluminium trialkyls or dialkyl aluminium hydrides which have been prepared by synthesis from aluminium, hydrogen and olefine. Considering, for example, the synthesis of aluminium trialkyls from aluminium, hydrogen and an olefine $C_nH_{2n}$ ($n=2$ or a higher integer) in accordance with the equation:

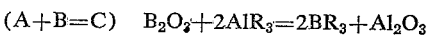
$$Al + \tfrac{3}{2}H_2 + 3C_nH_{2n} = Al(C_nH_{2n+1})_3$$

the boron alkyls can, according to this invention, be prepared in accordance with the following empirical equation:

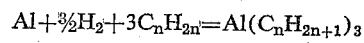
$$2Al + 3H_2 + 6C_nH_{2n} + B_2O_3 = 2B(C_nH_{2n+1})_3 + Al_2O_3$$

It is of the essence that in this case no additional auxiliary compounds are required for the production of boron trialkyls.

According to one particular feature of the invention, a molar ratio between the reactants organic aluminium compound and boroxol of 2:1 is preferably used. When using an excess of the organic aluminium compound, and more especially the aluminium trialkyl, the alkyl groups are in fact not fully utilized, whereas when using an excess of the boroxol, boron compounds are retained by the aluminium oxide formed in the reaction. When the reaction proceeds in this way, the industrial economy of the process is jeopardized.

The reaction according to the invention, using aluminium trialkyls, can also be carried out in two component stages. By using temperatures below 100° C. to begin with, only the first two alkyl groups of the aluminium trialkyls are reacted with the boroxols, for example in accordance with the following Equation 1:

(1) 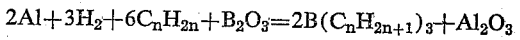 $2(RBO)_3 + 6AlR_3 = 6BR_3 + 2(RAlO)_3$

The liquid mixtures formed then react further at higher temperatures, and more especially at temperatures between 150 and 220° C. The third and last alkyl group of the aluminium trialkyls is then also used for the boron alkylation and thus the industrial economy of the process is substantially improved. 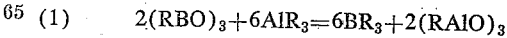 This second stage of the process proceeds, for example, in accordance with the following Equation 2:

(2) $\quad 2(RAlO)_3 + (RBO)_3 = 3BR_3 + 3Al_2O_3$

The process according to the invention thus operates in accordance with the empirical Equation B of these two component stages (1) and (2):

(B=(1)+(2)) $\quad (RBO)_3 + 2AlR_3 = 3BR_3 + Al_2O_3$

If aluminium dialkyl hydrides of the general formula $AlHR_2$ are used in this process in accordance with the invention, the aluminium dialkyl hydrides formed as intermediate products in the technical manufacture (dissolution of aluminium metal in aluminium trialkyls in the presence of hydrogen; see Belgian patent specification No. 546,432), or alternatively mixtures of such hydrides with aluminium trialkyls, can be reacted directly to form the corresponding boron compounds. It is not necessary to produce initially pure, that is to say hydride-free, aluminium trialkyls from the aluminium dialkyl hydrides with olefines, since the reaction with the boroxols proceeds with the utilisation of all alkyl and hydride groups of the aluminium compound employed, which was not to be expected.

For example, altogether less olefine is required when using aluminium dialkyl hydrides for the production of boron hydride compounds, which it is known can easily be prepared from alkylated boron compounds by hydrogenation (cf. R. Köster: Angewandte Chemie, 69, 94 (1957)). Whereas in fact the empirical reaction for the production of boron trialkyls from aluminium trialkyls proceeds in accordance with the equation:

$$2Al + 3H_2 + B_2O_3 + 6C_nH_{2n} = 2BR_3 + Al_2O_3$$

one third of the quantity of olefine is saved when using dialkyl aluminium hydrides, in accordance with the equation:

$$2Al + 3H_2 + B_2O_3 + 4C_nH_{2n} = B_2H_2R_4 + Al_2O_3$$

If boron hydride compounds are to be produced from the alkyl diboranes, the advantage of using aluminium dialkyl hydrides is readily apparent.

The reaction according to the invention can be carried out in the presence of suitable solvents. The use of solvents in carrying out the process is to be preferred if the intermediate products are to be kept in solution, as for example with the ethyl and propyl compounds. Aliphatic and aromatic hydrocarbons, and also ethers and amines, are suitable for use as solvents or diluents. Tertiary amines with saturated aliphatic hydrocarbon radicals are especially suitable. By using such a solvent, the solid aluminium compounds formed can be kept in solution in a particularly simple manner, so that a particularly uniform Reaction B is obtained. The solvents which are most advantageous for use in the process are the boron alkyls themselves since they do not represent substances which are extraneous to the process. Such a reaction is, then, carried out in practice using a dilute solution of boron trioxide in a boron alkyl. The aluminium oxide formed and precipitated then remains particularly well distributed in the reaction mixture.

As will be seen from the foregoing remarks, the reaction according to the invention is initiated even at room temperatures or below and is advantageously completed quantitatively by heating to about 200° C., especially when the process is carried out in two stages.

The reaction products (boron alkyls and aluminium oxide) formed by the process of the invention can be separated from one another in an extremely simple manner. In the production of boron alkyls with lower hydrocarbon radicals, and more especially with alkyl radicals having up to about 6 carbon atoms, these are distilled off under atmospheric pressure or even under reduced pressure. An aluminium oxide in a particularly surface-active form is then obtained directly as residue. In the recovery of boron trialkyls with longer hydrocarbon radicals, their separation from the solid aluminium compounds is advantageously effected by filtration or by extraction with the assistance of one of the diluents referred to above.

Since initially soluble intermediate products are formed in the reaction of the boroxols with the organic aluminium compounds, and more especially the aluminium trialkyls, the process of the invention can also be carried out continuously. In this case, the aluminum oxide is in fact not separated out at the rate at which the organic aluminium compounds, and more especially the aluminium trialkyls, are supplied to the reaction mixture. For example, the separation of solid substances is prevented, above all by the use of the aforementioned diluents when reacting ethyl and propyl compounds. With the higher alkyl compounds, the reaction mixtures remain liquid, even without the addition of solvents. Thus, the reaction mixture remains completely liquid and clear until just prior to the addition of the total residual quantity, and more especially the stoichiometric quantity, of organic aluminium compound. The aluminium oxide precipitates fairly suddenly when the quantity of the added organic aluminium compound approaches the calculated quantity. Such reaction mixtures which are still completely liquid only separate out solid aluminium oxide upon evaporation, and especially when the temperature in the distillation residue rises above 150° C., so that they are particularly suited to processing in continuous evaporators. The distillate in this case still contains some unmodified boroxol in addition to boron trialkyls.

It is true that the step of supplying the reaction mixture to the evaporators while it is still completely liquid is frequently very desirable, but it is not absolutely necessary. If the trialkyl boroxol is allowed finally to react with the aluminium trialkyl or dialkyl aluminium hydride, the aluminium oxide is initially separated out in the form of a firm jelly. This can be converted into a paste by intensive stirring, and this is also suitable for concentration by evaporation, and especially by continuous evaporation, even if somewhat less satisfactorily.

The following examples further illustrate the invention:

*Example 1*

Over a period of about 1 hour, starting at room temperature, a total of 228 g. (2 mols) of aluminium triethyl are run into 168 g. (1 mol) of ethyl boroxol containing 19.2% of boron (prepared from 98 g. of boron triethyl and 70 g. of boron trioxide by heating in an autoclave for 4–5 hours at 250–300° C.), which had been placed in a 750 cc. 3-necked flask (thermometer, stirrer, dropping funnel, reflux condenser) together with approximately 250 cc. of boron triethyl. The temperature in the reaction mixture rises to the boiling point of the boron triethyl (B.P.=94–95° C.). All the boron triethyl is thereafter distilled off, this taking place at atmospheric pressure to begin with. After adding practically the entire quantity of aluminium triethyl, the mixture becomes difficult to stir due to the formation of an aluminium oxide jelly. On distilling off the last fractions of boron triethyl at reduced pressure, this jelly changes into a colourless alumina gel. 280 g. (95% of the theoretical) of boron triethyl are obtained as distillate, in addition to the solvent. The residual aluminium oxide (approximately 100 g.) is then completely dry.

*Example 2*

From 630 g. (3 mols) of n-propyl boroxol (15.4% boron, prepared as in Example 1, but from boron tri-n-propyl) and 468 g. (3 mols) of aluminium tri-n-propyl, a colourless liquid is obtained in a 2-litre 3-necked flask (thermometer, stirrer, dropping funnel) by spontaneous heating when the two liquids are mixed. This colourless liquid is introduced dropwise into a three-necked flask (thermometer, stirrer device, dropping funnel, reflux condenser with cooled receiver) which is heated to about 200° C. and is under reduced pressure, the aluminium oxide formed by the reaction being precipitated and the liquid boron compounds (boron tripropyl and excess boroxol) distilling off. On completion of the dropwise introduction and subsequent heating of the decomposition flask to 250 °C. under reduced pressure, a total of 880 g. of distillate with a boron content of approximately 10% boron is obtained, that is to say a 93% yield. The residue consists of 150 g. of aluminium oxide. The mixture of boron tripropyl and propyl boroxol obtained is subjected to fractional distillation in vacuo. Unreacted propyl boroxol (90° C./12 mm. Hg) is obtained in addition to the boron tripropyl (45° C./12 mm. Hg) which is formed.

Example 3

This example illustrates the continuous production of boron tri-n-propyl in apparatus such as shown in the single FIGURE of the accompanying drawing.

Approximately 50 litres of liquid boron compounds together with approximately 5 kg. of powdered boron trioxide are maintained in a 100-litre reactor A (stirrer device, filling pipe for powdered, dry boron trioxide, withdrawal device for the liquid with a high boroxol content extending to near the bottom of the reactor (see C), supply pipe for liquid with a high boron tripropyl content, thermometer pipe) which reactor can be loaded to a maximum pressure of 25 atm. The boron trioxide can be replenished constantly through a filling device (about 1.4 kg./hour). The reactor A is at a temperature of approximately 280° C. and is constantly stirred. A mixture of boroxol and boron tripropyl is withdrawn from the reaction vessel at a speed of about 6 litres/hour by way of a fine screen arranged at C, and is pumped into the second reactor B. This second reactor also has a capacity of 100 litres and is maintained at a temperature of approximately 50–60° C. While stirring well, aluminium tripropyl is injected into this reactor at a speed of about 4 litres per hour. By way of the withdrawal pipe D, the mixture of boron trialkyl and "dissolved" aluminium trioxide is pumped to a continuous evaporator device E (speed about 10 litres per hour). This device (for example a thin-layer evaporator) is heated to approximately 180° C. and is under a reduced pressure (about 1 mm. Hg). At the bottom end of the evaporator plant the colourless dry aluminium oxide is collected and withdrawn at intervals (about 2 kg. per hour) by way of a vacuum gate (not shown). The boron tripropyl distils off at the upper end of the evaporator.

After condensation, it is pumped to a column F (12 mm. Hg, 50–60° C.). At the upper end thereof, the quantity of pure boron tripropyl (7.74% boron) equivalent to the aluminium tripropyl pumped in is continuously extracted (about 4 litres per hour). Boron trialkyl runs off at the bottom end of the distillation device F. This boron trialkyl is pumped back into the first reactor A, so that the cycle is thereby closed.

It is also possible, and sometimes advantageous, by the process of the invention to prepare mixtures of boron trialkyls such as those which occur for example when processing mixtures of aluminium trialkyls. If the aluminium trialkyls have been prepared from olefine mixtures (for example ethylene plus propylene), different experimental data from those indicated in Example 3 (for example as to temperature and pressure in the columns) are obtained for such mixture systems in the continuous process. For the reactors, however, the experimental data indicated in Example 3 for the boron tripropyl can then also be substantially applied.

Example 4

A total of 198 g. (1 mol) of aluminium triisobutyl is run quickly at room temperature into a mixture of 126 g. (0.5 mol) of isobutyl boroxol and 150 g. of boron triisobutyl while stirring well, and under a nitrogen atmosphere. The temperature rises to approximately 100° C.; thereafter, heating is continued for about 3–4 hours at 170–180° C., the mixture remaining completely liquid. Under reduced pressure, 395 g. (93.5% of the theoretical) of boron triisobutyl are obtained by distillation; the aluminium oxide separating out during distillation is left as a residue.

Example 5

As in Example 4, from n-butyl boroxol in boron tri-n-butyl as solvent and by reaction with aluminium tri-n-butyl, pure boron tri-ni-butyl is obtained, by distillation, in a yield of 92%, with aluminium oxide as a residue.

Example 6

35 g. (0.5 mol) of dried boron trioxide are heated together with 280 g. (2 moles) of boron tripropyl in a pressure vessel for 3–4 hours at 250° C., the boron trioxide dissolving in the boron tripropyl as propyl boroxol.

A total of 156 g. (1 mol) of aluminium tripropyl is added to this mixture at room temperature in the course of about 30 minutes; this raises the temperature to 80–90° C. Heating is then continued and the aluminium oxide formed is separated out as a jelly at a temperature of about 120° C. All the boron compounds are distilled off at reduced pressure. 400 g. (95% of the theoretical) of boron tripropyl are obtained; the residue consists of the solid aluminium compound (70 g.).

Example 7

In the course of approximately 1 hour, a solution of 2 mols of ethyl boroxol in 200 g. of triethylamine is run into 4 mols of aluminium triethyl while stirring well. The temperature of the reaction mixture rises during the addition to about 90–100° C. The completely thinly liquid mixture is thereafter supplied to a thin-layer evaporator which is under reduced pressure (lower than 10 mm. Hg) and heated to 160–190° C., the resulting boron triethyl being distilled off together with the solvent. A mixture consisting of 550 g. of boron triethyl and the amine which was introduced, is obtained as distillate. In addition, a finely powdered aluminium oxide is obtained as residue.

Example 8

570 g. of aluminium triethyl are placed with 270 g. of boron triethyl in a 2.5 litre 3-necked flask. 400 g. of ethyl boroxol are added dropwise over a period of approximately 1 hour while stirring well. The temperature is thereby raised from 20° C. to the boiling point of the boron triethyl, the aluminium compounds which aref ormed being separated out in jelly form towards the end of the dropwise addition. The boron triethyl is distilled off at reduced pressure and while heating the bath to 200–220° C. The yield is more than 90% of the theoretical.

Example 9

336 g. of n-hexyl boroxyl are mixed with 564 g. of aluminium tri-n-hexyl running the aluminium trialkyl into the boron compound under nitrogen while stirring well. The temperature of the reaction mixture is thereby raised from room temperature to approximately 60° C. The mixture is thereafter heated for 2–3 hours to about 180° C., the last alkyl group of the aluminium hexyl then reacting with the boroxol. Under greatly reduced pressure (about 0.1 mm. Hg), the major part (610 g.) of the trihexyl boron which is formed can be distilled off (B.P. 0.1=99–100° C.; melting point = −37° C.). Another 100 g. of the boron alkyl are obtained from the residue by extraction with benzene. The yield is 89% of the theoretical. The trihexyl boron has a boron content of 3.98%.

Example 10

After a reaction in accordance with Example 9, boron tridecyl is obtained from 450 g. (1 mol) of aluminium tridecyl and 252 g. (0.5 mol) of decyl boroxol by extraction with cyclohexane. After separating the solution from the aluminium oxide which is formed and distilling off the extraction agent, the boron tridecyl can be recovered as a residue in the form of a slightly viscous, colourless liquid. The compound can also be distilled under high vacuum without decomposition (decene being split off and didecyl borohydride being formed). The yield of pure boron trialkyl (2.5% boron) is 555 g., that is to say 85% of the theoretical.

*Example 11*

A solution of 210 g. (1 mol) of n-propyl boroxol in 250 cc. of boron tri-n-propyl is heated in a nitrogen atmosphere and while stirring well to 150–160° C. and a total of 228 g. (2 mols) of aluminium di-n-propyl hydride is added dropwise over a period of about 1 hour. The mixture initially starts to boil violently and gradually becomes more difficult to stir because of the precipitation of aluminium oxide. Thereafter, all boron compounds are distilled off at reduced presure (about 1 mm. Hg), the temperature in the reaction vessel rising up to about 200° C. 680 cc. of a mixture of 310 g. of boron tri-n-propyl and 175 g. of tetra-n-propyl diborane (about 92% of the theoretical) are obtained as distillate. The completely colourless dry residue contains about 100 g. of aluminium oxide and evolves practically no more gas on being added to water.

*Example 12*

A total of 49.7 g. (0.35 mol) of aluminium diisobutyl hydride is quickly added while stirring well and under nitrogen to 145 g. of a mixture of boron triisobutyl (101.5 g.) and iso-butyl boroxol (43.5 g.) containing 8.0% of boron (corresponding to 12.1 g. (0.173 mol) of boron trioxide $B_2O_3$), the temperature of the mixture rising from 20° C. to approximately 80° C. In order to complete the reaction, the mixture is heated for some time so that it boils gently at about 180° C. The boron compounds are thereafter distilled off under reduced pressure, the solid aluminium compound (25 g.) gradually being separated out. 166 g. of a colourless liquid consisting of a mixture of boron triisobutyl and tetraisobutyl diborane is obtained as distillate. The yield is 94% of the theoretical.

What I claim is:

1. Process for the continuous production of boron alkyls and active aluminium oxide which comprises substantially continuously passing an alkyl boroxol and a member selected from the group consisting of aluminium trialkyl, aluminum dialkylhydrides and mixtures thereof into a first reaction zone, reacting said alkyl boroxol and said group member in said first reaction zone at a temperature below 100 degrees C. in the presence of a solvent selected from the group consisting of saturated aliphatic hydrocarbons, aromatic hydrocarbons, ethers, amines, and boron alkyls wherein when said solvent is a boron alkyl, the same is initially present in amount sufficient to form a dilute solution of said alkyl boroxal to thereby form a liquid mixture, substantially continuously withdrawing the liquid mixture from said reaction zone, raising the temperature of the liquid mixture to above 100 degrees C. in a second reaction zone to thereby substantially continuously form a boron alkyl and active aluminium oxide.

2. A process according to claim 1 in which said group member is an aluminium trialkyl.

3. A process according to claim 2 in which the reaction in said second reaction zone is continued at a temperature between about 150 and 220 degrees C.

4. A process according to claim 1 in which said group member is an aluminium trialkyl, the alkyl radical of which has at least two carbon atoms.

5. A process according to claim 1 in which said solvent is a tertiary amine.

References Cited in the file of this patent

UNITED STATES PATENTS 2,853,526    Perrine _____ Sept. 23, 1958

OTHER REFERENCES

Goubeau et al.: Chem. Abs., vol. 46, page 3893 (1952).